United States Patent [19]
Furukawa et al.

[11] Patent Number: 5,367,654
[45] Date of Patent: Nov. 22, 1994

[54] METHOD AND APPARATUS FOR CONTROLLING STORAGE IN COMPUTER SYSTEM UTILIZING FORECASTED ACCESS REQUESTS AND PRIORITY DECISION CIRCUITRY

[75] Inventors: Masao Furukawa; Tadaaki Isobe; Shigeko Yazawa, all of Hadano, Japan

[73] Assignee: Hitachi Ltd., Tokyo, Japan

[21] Appl. No.: 337,070

[22] Filed: Apr. 12, 1989

[30] Foreign Application Priority Data

Apr. 13, 1988 [JP] Japan ............................. 63-89011
Sep. 21, 1988 [JP] Japan ........................... 63-235087

[51] Int. Cl.$^5$ ...................... G06F 13/14; G06F 12/00
[52] U.S. Cl. .................................. 395/425; 395/800; 364/DIG. 1
[58] Field of Search ... 364/200 MS File, 900 MS File; 395/425, 800

[56] References Cited

U.S. PATENT DOCUMENTS

| | | | |
|---|---|---|---|
| 4,600,986 | 7/1986 | Scheuneman et al. | 395/425 |
| 4,665,479 | 5/1987 | Oinaga | 395/800 |
| 4,777,593 | 10/1988 | Yoshida | 395/800 |
| 4,827,407 | 5/1989 | Nakatani | 395/800 |
| 4,843,543 | 6/1989 | Isobe | 395/425 |
| 4,910,667 | 3/1990 | Tanaka et al. | 395/425 |
| 4,949,247 | 8/1990 | Stephenson et al. | 395/800 |
| 5,010,477 | 4/1991 | Omoda et al. | 395/800 |
| 5,060,148 | 10/1991 | Isobe et al. | 395/800 |

FOREIGN PATENT DOCUMENTS 62-251956 11/1987 Japan.

Primary Examiner—Glenn Gossage
Attorney, Agent, or Firm—Antonelli, Terry, Stout & Kraus

[57] ABSTRACT

A storage control apparatus of a computer system having a plurality of transfer pipelines issuing access requests to a plurality of memory banks of a storage device. Each memory bank is independently accessible in response to an access instruction from a vector processing device. Each of the transfer pipelines includes a plurality of access request control devices to which the access instruction from the vector processing device is allocated in association with elements of a vector. The access request control devices simultaneously issue in response to an access instruction a plurality of access requests. Each transfer pipeline also includes a priority decision device which detects whether or not the access requests forecasted to be issued from the plural access request control devices contend with the access requests issued from the plural access request control devices of another transfer pipeline. In a case where it is detected that a contention takes place, processing of the access requests of another transfer pipeline effecting the succeeding access instruction is set to a wait state such that the access requests of the pertinent transfer pipeline effecting the preceding access instruction are preferentially processed.

18 Claims, 14 Drawing Sheets

FIG. 2
PRIOR ART
```
DO 10 i = 1, 100
    A(i) = B(i) + C(i)
10 CONTINUE
```
FIG. 3A
PRIOR ART
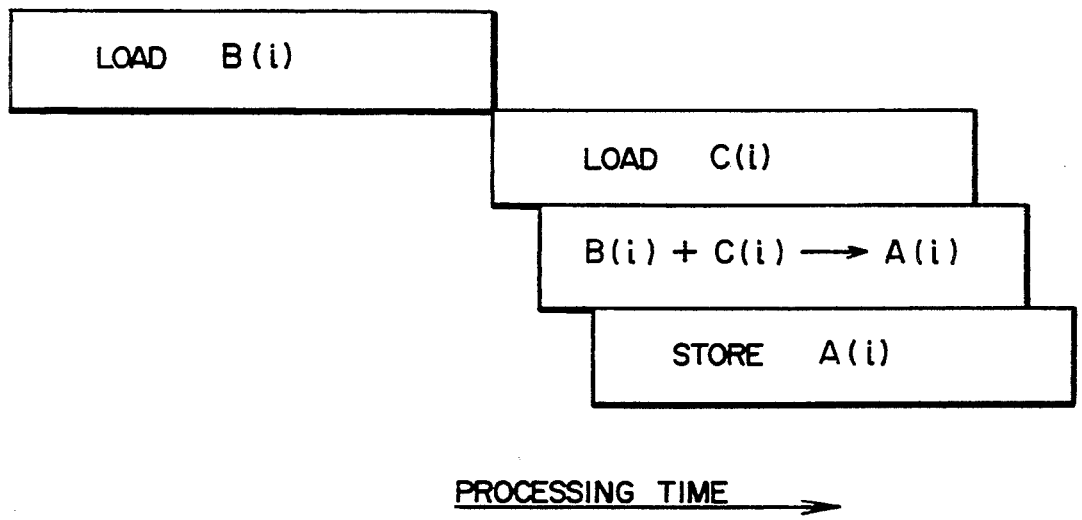
PROCESSING TIME →
FIG. 3B
PRIOR ART
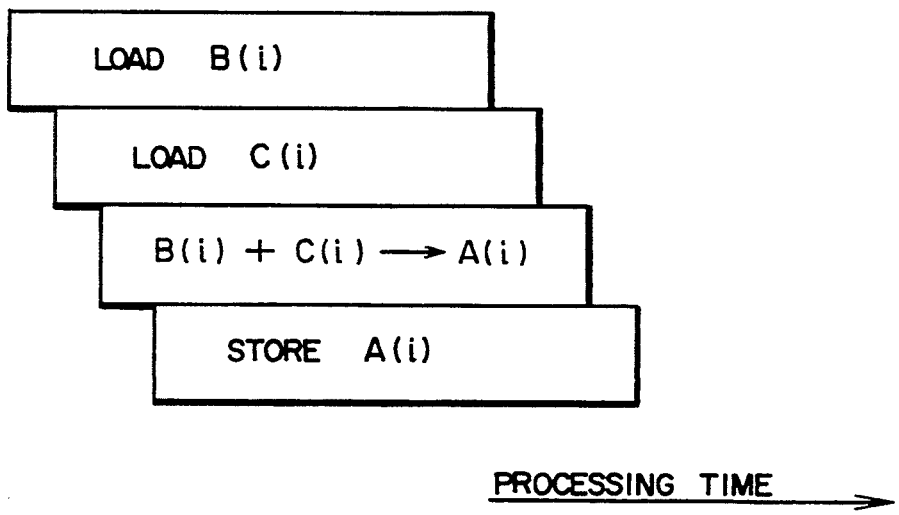
PROCESSING TIME →

FIG. 5
PRIOR ART

| TRANSFER PIPELINE A | 00 | 04 | 08 | 0C | 10 | 14 |
|---|---|---|---|---|---|---|
| S00 | 00 | 04 | 08 | 0C | 10 | 14 |
| S01 | 01 | 05 | 09 | 0D | 11 | 15 |
| S02 | 02 | 06 | 0A | 0E | 12 | 16 |
| S03 | 03 | 07 | 0B | 0F | 13 | 17 |

| TRANSFER PIPELINE B | | | | | | |
|---|---|---|---|---|---|---|
| S10 | | 06 | 0A | 0E | 12 | 16 | 1A |
| S11 | | 07 | 0B | 0F | 13 | 17 | 1B |
| S12 | | 08 | 0C | 10 | 14 | 18 | 1C |
| S13 | | 09 | 0D | 11 | 15 | 19 | 1D |

→ PRIORITY DECISION (BANK BUSY CHECK) →

ACCESS REQUESTS SENT TO STORAGE

| | | | | | | | | | |
|---|---|---|---|---|---|---|---|---|---|
| S00 | 00 | 04 | | 0A | 0E | 12 | 16 | | 1C |
| S01 | 01 | 05 | | 0B | 0F | 13 | 17 | | 1D |
| S02 | 02 | 06 | | 0A | 0E | 12 | | 18 | |
| S03 | 03 | 07 | | 0B | 0F | 13 | | 19 | |
| S10 | | | | | | | | | |
| S11 | | | | | | | | | |
| S12 | | 08 | | 0C | 10 | 14 | | 18 | |
| S13 | | 09 | | 0D | 11 | 15 | | 19 | |

T0  T2  T4  T6  T8  T10  T12  → TIME

METHOD AND APPARATUS FOR CONTROLLING STORAGE IN COMPUTER SYSTEM UTILIZING FORECASTED ACCESS REQUESTS AND PRIORITY DECISION CIRCUITRY

BACKGROUND OF THE INVENTION

The present invention relates to a method of and an apparatus for controlling storage in a computer system, and in particular, to a method of and an apparatus for controlling storage in a computer system in which there are disposed a plurality of memory access pipelines to effect parallel processing of elements of a vector so as to solve a problem of contentions among access requests issued from vector processors to storage, thereby processing an access instruction at a high speed.

As a conventional technology related to a storage control method in which a plurality of access request controllers simultaneously issue access requests to a storage including a plurality of storage units (memory banks) each being independently accessible, there has been known, for example, a technology described in the JP-A-62-251956 and the like.

The storage control method according to the conventional technology of this type will next be described with reference to FIGS. 1 to 5.

FIG. 1 shows a configuration example of a primary section of a computer system achieving parallel pipeline processing on elements of a vector in which the computer system includes a plurality of (for example, four in this example) arithmetic units 50A to 50D, vector registers 51A to 51D functioning as data buffers between the arithmetic device 50 and storage 55, access request control devices 52A to 52D, a storage control device 53, and a storage 55. The storage device 55 comprises a plurality of (for example, four in this example) memory banks 55A to 55D which are independently accessible based on a signal attained by decoding address information associated with an access request. The storage control device 53 includes access request stack circuits 53A to 53D corresponding to the access request control devices 52A to 52D, read data buffer circuits 56A to 56D, and access request priority decision circuits 54A to 54D corresponding to the memory banks 55A to 55D, respectively.

Referring to the computer system of FIG. 1, description will be given of an example of operations in which data is read from the storage, an arithmetic operation is conducted thereon, and data is written in the storage.

First, in a case where vector data is read from the storage 55 so as to be loaded in the vector register 51, the respective elements of the vector are assigned to the access request control devices 52A to 52D as follows to create an access request.

Access request control device
52A: Elements 0, 4, 8, . . . , 4n
52B: Elements 1, 5, 9, . . . , 4n+1
52C: Elements 2, 6, 10, . . . , 4n+2
52D: Elements 3, 7, 11, . . . , 4n+3
(where, n is 0 or a positive integer).

For access requests simultaneously created, the respective four elements are simultaneously sent to the corresponding access request stack circuits 53A to 53D. Each of the circuits 53A to 53D then issues, based on the address of the access request, a request to any one of the objective priority decision circuits 54A to 54D. In a case where there occurs a contention among a plurality of access requests, each of the priority decision circuits 54A to 54D selects an access request according to a predetermined priority and then transmits the access request to a corresponding one of the memory banks 55A to 55D. Read data obtained in association with the access request issued to each memory bank is returned to the storage control device 53 after a fixed period of time (equivalent to an access time of a random access memory (RAM) constituting the storage) so as to be sent to one of the read data buffer circuits 56A to 56D associated with the access request control devices 52A to 52D. The read data items are returned, when all data items associated with the four access requests simultaneously issued from the access request control devices 52A to 52D are read out, to the respective access control devices 52A to 52D in an order of issuance of the requests and are then loaded in the vector registers 51A to 51D at the same time. Assignment of the elements to the vector registers is as follows.

Vector register
51A: Elements 0, 4, 8, . . . , 4n
52B: Elements 1, 5, 9, . . . , 4n+1
52C: Elements 2, 6, 10, . . . , 4n+2
52D: Elements 3, 7, 11, . . . , 4n+3

Next, in a case where data stored in the vector registers 51A to 51D undergo an arithmetic operation, the respective elements of the vector are assigned as follows and the results of the arithmetic operation are stored again in the vector registers 51A to 51D.

Arithmetic unit
50A: Elements 0, 4, 8, . . . , 4n
50B: Elements 1, 5, 9, . . . , 4n+1
50C: Elements 2, 6, 10, . . . , 4n+2
50D: Elements 3, 7, 11, . . . , 4n+3

In this arithmetic operation, four arithmetic units 50A to 50D effect operations completely in a synchronized fashion such that, for example, the results of the elements 0, 1, 2, and 3 are simultaneously attained and are then loaded in the vector registers 51A to 51D at the same time.

Finally, in a case where data stored in the vector registers 51A to 51D are to be written in the storage 55, the respective elements are assigned to the access request control devices 52A to 52D like in the case of the data read operation above such that four elements, for example, the elements 0, 1, 2, and 3 are sent to the corresponding access request stack circuits 53A to 53D. The subsequent processing up to an access request issuance to the storage 55 is similar to that of the read operation above.

As described above, the respective four arithmetic units 50A to 50D, the four vector registers 51A to 51D, and the four access request control devices 52A to 52D synchronously effect processing on the respective elements. In consequence, in a parallel element processing method associated with the synchronized operation, it is possible to employ a logic configuration in which a control system controls the four arithmetic units 50A to 50D, the vector registers 51A to 51D, and the access request control devices 52A to 52D.

However, in the storage control device 53, there may occur a case where due to a state (for example, a busy state caused by a preceding access request) or a contention with another access, the four access requests respectively issued at the same time from the access request control devices 52A to 52D in the synchronized fashion are not simultaneously processed and hence there appears a shift in time between transmissions of the access requests to the memory banks 55A to 55D. In consequence, there has been adopted a control method in which in the read data buffers 56A to 56D of the storage control device 53, the subsequent operations are set to the wait state until all read data items corresponding to the access requests simultaneously sent from the access request control devices 52A to 52D are completely stored therein such that at a point of time when all the read data items are loaded therein, the four read data items are simultaneously sent to the access request control devices 52A to 52D.

When a program of FIG. 2 is executed by a vector processor constituted with components like those shown in FIG. 1 such as vector arithmetic units and vector registers, the result of the operation is obtained in general as follows. Assume that B(i), C(i), and A(i) are vectors stored in a storage device.

1. Operand data B(i) arranged in the storage are sequentially loaded in a vector register (X) (vector load instruction).
2. In a similar fashion to that of the operation 1 above, operand data C(i) arranged in the storage are sequentially loaded in a vector register (Y) (vector load instruction).
3. Data respectively of the vector registers (X) and (Y) are sequentially read out so as to undergo an arithmetic operation by use of a vector arithmetic unit, thereby sequentially storing a result of an addition thereof in a vector register (Z) (vector add instruction).
4. The contents of the vector register (Z) containing the result of the addition are sequentially read out so as to be written in the storage (vector store instruction).

Through the operations (instructions) above, there can be attained a result of the operation of B(i)+C(i).

FIG. 3A shows a timing chart of processing of the operation effected in a computer having only one transfer pipeline from the storage to the vector registers and only one transfer pipeline from the vector registers to the storage. That is, since there is provided only one transfer pipeline for the transfer operation associated with the load operation, the data of C(i) cannot be loaded until the load operation of B(i) is finished. Although the vector processor can start the arithmetic operation beginning from an element for which an operand is loaded (in an ascending order of the element numbers 0, 1, 2, etc.) by use of a chaining mechanism of the load, add, and store operations, the chaining mechanism does not start an operation thereof unless the load operation of C(i) is initiated. In order to fully develop a high-speed operation, for example, the operation of the chaining mechanism of the arithmetic unit, it is necessary to provide at least two transfer pipelines from the storage to the vector registers. FIG. 3B shows a timing chart of processing of the operation when two transfer pipelines are provided. With the provisions of two transfer pipelines thus provided, the program of FIG. 2 can be executed in a processing time which is about half that required when only one pipeline is used as described above.

However, in a computer system employing a so-called parallel element pipeline processing method in which access requests are simultaneously issued, if the number of transfer pipelines is increased to two, there appears a contention between memory accesses achieved through the respective transfer pipelines and hence the efficiency of the system may be lowered in some cases.

On the other hand, in a computer system having a plurality of vector processors of the conventional technology, in both cases where a plurality of jobs are assigned to the plural vector processors for the processing thereof and where a job is subdivided into partitions to be assigned to the plural vector processors for the processing thereof, it is possible to reduce the processing time if all the vector processors can be used for the processing. In the conventional technology having a memory access pipeline to be processed in a so-called parallel element pipeline processing method, the processing is achieved by establishing a synchronization among access requests issued at the same time. When memory access pipelines are disposed, like in a case of a multiprocessor, between a plurality of (for example, two) vector processors and a storage, there arises a problem that the processing efficiency is decreased due to a contention between the access requests on the respective memory access pipelines. This problem will be concretely described with reference to FIGS. 4 and 5.

FIG. 4 shows a case of a computer system including one or two vector processors. When a single vector processor is disposed, there are provided two transfer pipelines to storage; whereas when two vector processors are used, there are arranged two transfer pipelines respectively from the vector processors to the storage. Each transfer pipeline possesses in either arrangement four access request control devices so as to effect the processing while establishing a synchronization among four access requests. Assume here that, as shown in FIG. 5, a transfer pipeline A accesses a consecutive address region in the storage beginning from a bank number 00 and a transfer pipeline B effects an access, with a delay of one machine cycle with respect to the access of the transfer pipeline A, to the consecutive address region in the storage beginning from a bank number 06. First, access request control devices S00, S01, S02, and S03 are assigned at time T0 with the bank numbers 00, 01, 02, and 03, respectively. In this situation, since the transfer pipeline B is initiated with a delay of one machine cycle, there does not exist any access request contending with an access request from the transfer pipeline A, and hence the access requests issued from the access request control devices S00 to S03 are transmitted to the storage device. At time T2, the access request control devices S00 to S03 of the transfer pipeline A are assigned with the bank numbers 04, 05, 06, and 07, respectively; whereas the access request control devices S10 to S13 of the transfer pipeline B are assigned with the bank numbers 06, 07, 08, and 09, respectively. Access requests issued from S00 and S01 are sent to the storage since there does not occur any contention in this case. The access requests from S02 and S03 respectively access the bank numbers to be accessed by the access requests respectively issued from S10 and S11 (occurrence of contentions). Consequently, the access requests are selected according to the predetermined priority so as to be sent to the storage. In this situation, assuming that the priority is assigned as S00>S01>S02>S03>S10>S11>S12>S13, the access requests issued from S02 and S03 are to be selected. Furthermore, the access requests issued from S12 and S13 are sent to the storage since there does not exist any contention. The access requests transmitted to the storage at T4 finally include those issued from the access request control devices S00, S01, S02, S03, S12, and S13. Next, at time T4, the access request control devices S00 to S03 are assigned with the bank numbers 08, 09, 0A, and 0B, respectively; whereas the access request control devices S10 to S13 are assigned with the bank numbers 0A, 0B, 0C, and 0D, respectively. Access requests respectively issued from S00 and S01 are associated with the bank numbers of the access requests sent from S12 and S13 in the preceding machine cycle (at T2), in consequence, the access operation is set to a wait state for a period of the bank busy state. (The access request transmission is prevented for a cycle time of the RAM constituting the storage.) The access requests from S10 and S12 contend with the access requests from S02 and S03 like in the case of the previous machine cycle such that the access requests from S02 and S03 are selected according to the priority. As a result, the access requests transmitted to the storage at time T6 include those from S02, S03, S12, and S13. Similarly, the access requests sent to the storage at points of time T8, T10, T12, etc. are the same as those issued at time T6. That is, as shown in FIG. 5, the access requests sent to the storage include those from the access request control devices S02, S03, S12, and S13, whereas the access requests from the access request control devices S00, S01, S10, and S11 are set to the wait state for a period of the bank busy state. As described above, for a transfer pipeline processed in the parallel element pipeline processing method, since the processing is achieved by establishing a synchronization between the access requests issued at the same time, there is required a wait time associated with the access requests simultaneously issued and hence there occurs a considerable decrease in the efficiency.

In order to prevent the deterioration of the efficiency, it may be possible to process a preceding transfer pipeline with a higher priority such that the processing of the succeeding transfer pipeline is interrupted (is set to a wait state) for a period of time of the bank busy state so as to delay the time when the processing is started, thereby reducing the processing time. In consequence, it is desirable to delay the processing start time of the transfer pipeline to be processed in the parallel element pipeline processing method by period of time of the bank busy state, However, the storage control method of the prior art technology described above is established with a premise that the processing is conducted by use of one transfer pipeline, namely, considerations have not given to a storage control method in which a plurality of transfer pipelines are employed. In consequence, in a case where a plurality of transfer pipelines are processed in the parallel element pepeline processing method, there arises a problem as described above that the efficiency is greatly lowered in a case of a memory access in which the addresses are consecutive in a memory, the cases occupying at least 50% of the overall memory accesses.

SUMMARY OF THE INVENTION

It is therefore an object of the present invention to provide a method of and an apparatus for controlling storage in a computer system. The present invention provides a storage control method employing a plurality of transfer pipelines for effecting a so-called parallel element pipeline processing to achieve processing steps, with a synchronization therebetween, of a plurality of access requests simultaneously issued. The control method minimizes decreases in the efficiency do to an access contention. Namely, the access wait time is reduced to a wait time of a bank busy time and a plurality of access requests are processed at a high speed with a synchronization established therebetween, thereby solving the problems of the conventional technology.

In order to achieve the object above, according to the present invention, there is provided an apparatus for controlling a storage in a computer system having a plurality of transfer pipelines and a storage including a plurality of memory banks, each bank being accessible in response to an access instruction from at least one vector processor. Access requests are issued through the plural transfer pipelines to memory banks of the storage. Each transfer pipeline includes a plurality of access request control devices to which an access instruction from the at least one vector processor is assigned. The access request control devices correspond to elements of a vector so as to simultaneously issue a plurality of access requests. Each pipeline also includes a priority decision device which determines whether or not access requests forecasted to be issued from the plurality of access request control devices contend with access requests issued from the plurality of access request control devices associated with another transfer pipeline. When a contention is detected, processing of the access requests of the another transfer pipeline to a succeeding access instruction is set to a wait state so as to process with a higher priority the access requests of a transfer pipeline which is processing a preceding access instruction.

That is, in a case where an access operation to a sequence of data items such as vector data is achieved by use of a computer system having a plurality of transfer pipelines in which vector elements are assigned to a plurality of access request control devices for the processing thereof, each access request control device detects, based on information from a vector processor and address information, whether or not an access is effected to an area of consecutive addresses in storage. The result of the detection is added to an access request so as to be sent to the priority decision device. In the priority decision device, when a consecutive area is accessed in the storage, a bank number to be accessed through a transfer pipeline which is processing a preceding access instruction from the vector processor is memorized for each machine cycle and the next bank numbers to be accessed within the bank busy time are computed so as to be stored. If there exists a possibility that these bank numbers thus obtained contend with bank numbers to be accessed in a transfer pipeline which is processing a succeeding access instruction, the access requests of the transfer pipeline which is processing the succeeding access instruction are set to a wait state so as to process with a higher priority the access requests of the preceding transfer pipeline.

As a result, it is possible to minimize a shift in the synchronization among the access requests simultaneously issued from a plurality of access request control devices and to issue access requests in a parallel fashion to the storage at a high speed. Furthermore, since the processing of the transfer pipeline having issued preceding access requests to the storage control device is effected with a higher priority, there is implemented a favorable processing configuration with respect to an execution of a program.

Incidentally, the present invention is applicable to a case where an access instruction from a vector processor is assigned to a plurality of transfer pipelines for the processing thereof and to a case where access instructions from a plurality of vector processors are processed by use of a plurality of transfer pipelines associated therewith.

BRIEF DESCRIPTION OF THE DRAWINGS

These and other objects and advantages of the present invention will become apparent by reference the following description and accompanying drawings wherein:

FIG. 2 is a schematic diagram showing an example of a program executed by the computer system of FIG. 1;

FIG. 3A is a schematic diagram of a timing chart of processing time in a case where the program of FIG. 2 is executed by the computer system of FIG. 1;

FIG. 3B is a schematic diagram of a timing chart of processing time in a case where the program of FIG. 2 is executed by the computer system of FIG. 1 by use of two transfer pipelines;

FIG. 5 is a schematic diagram showing a flow of access request processing executed in the computer system of FIG. 4;

DESCRIPTION OF THE PREFERRED EMBODIMENTS

Figure 6:
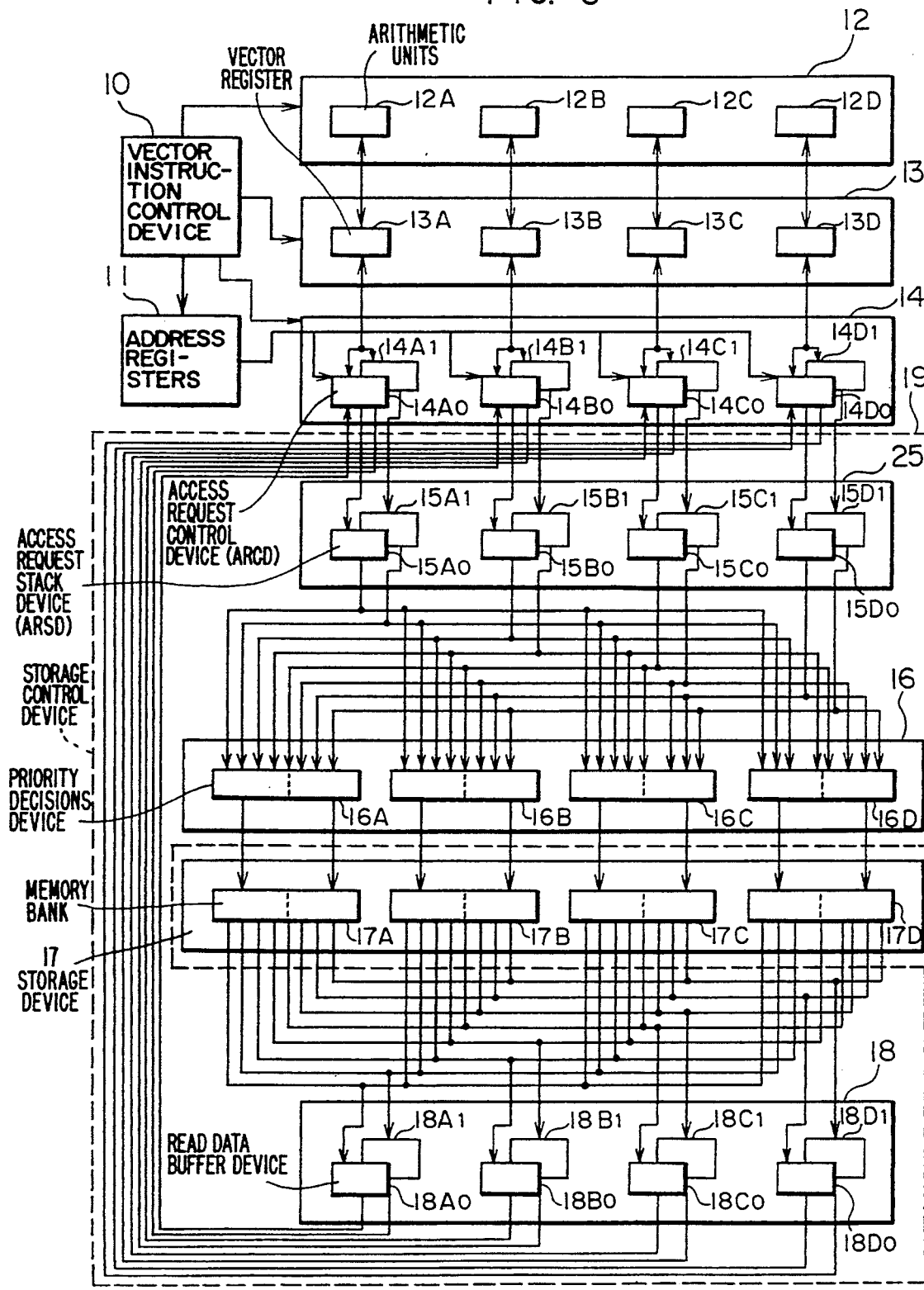
FIG. 6 is a block diagram showing a configuration example of a computer system to which an embodiment of a storage control device is applied according to the present invention.

Description will now be given of an embodiment of a storage control device according to the present invention. FIG. 6 shows a configuration example of the primary portion of a computer system processing a vector instruction through parallel element pipeline processing to which the present invention is applied. The computer system here includes a vector instruction control device for effecting various controls such as a control of a vector arithmetic unit, read and write controls on a vector register, and a control of an access request control device. A group of address registers 11 are provided indicating addresses in a storage device 17 when data is read from the storage device 17 to a vector register or when data is written from a vector register into the storage device 17. Also provided are a plurality of (e.g. four in this embodiment) arithmetic units 12A to 12D and, vector registers 13A to 13D functioning as data buffers between an arithmetic device 12 including the arithmetic units 12A to 12D and the storage device 17. A plurality of (e.g. two) pairs of access request control devices $14A_0$ to $14D_0$ and $14A_1$ to $14D_1$ are provided for issuing address requests by computing addresses based on an instruction decode instruction from the vector instruction control device 10 and address information from the group of address registers 11, a storage control device 19, and a storage device 17. The storage device 17 comprises a plurality of (e.g. four in this embodiment) groups 17A to 17D of memory banks each being independently accessible so as to decode address information associated with an access request to determine one of the groups of memory banks above. The storage control device 19 includes two pairs of access request stack devices $15A_0$ to $15D_0$ and $15A_1$ to $15D_1$ corresponding to the two pairs of access request control devices, two pairs of read data buffer devices $18A_0$ to $18D_0$ and $18A1$ to $18D_1$ similarly corresponding to the two pairs of access request control devices, and priority decision devices 16A to 16D corresponding to the groups of the memory banks 17A to 17D, respectively.

In this system, the access request control devices $14A_0$ to $14D_0$, the associated access request stack devices $15A_0$ to $15D_0$, the priority decision circuits 16A to 16D, and the read data buffer devices 18A0 to 18D0 constitute a transfer pipeline of system 0; whereas the access request control devices $14A_1$ to $14D_1$, the associated access request stack devices $15A_1$ to $15D_1$, the priority decision circuits 16A to 16D, and the read data buffer devices $18A_1$ to $18D_1$ constitute a transfer pipeline of system 1.

Referring to the computer system of FIG. 6, description will next be given of an outline of the operation in which processing is executed in the parallel element pipeline processing method based on an example of operations such as a read operation from the storage device, an arithmetic operation, and a write operation in the storage.

First, when the vector instruction control device 10 decodes a vector instruction which causes vector data to be retrieved by the access control device 14 from the storage device 17 stored into a vector register 13 (read). A code indicating a kind (the operation content, e.g. an 8-byte read operation) of the vector instruction and the contents of a vector address register specified by the vector instruction, a vector address base register, and a number of the vector address incrementation register are read from the group of address registers 11 so as to be sent to the access request control device 14. In addition, the vector instruction control device 10 determines either one of the two pairs of logically disposed access request control devices for assigning the processing thereto. If neither one of the access request control devices is assigned with access requests, the processing is destined to the access request control devices $14A_0$ to $14D_0$; whereas if access requests exist for the system 0 transfer pipeline and the system is in an access operation, the processing is assigned to the access request control devices $14A_1$ to $14D_1$; furthermore, if the system 1 transfer pipeline is in a state of an access operation, the processing is assigned to the transfer pipeline of the system 0. In a case where the transfer pipelines of the systems 0 and 1 are in the access operation, the vector instruction control device 10 sets the assign processing to a wait state and then allocates the processing to a transfer pipeline which first enters a state of an operation other than the access operation. In this embodiment, for the first read operation, the vector instruction control device 10 assigns the processing to the system 0 transfer pipeline such that the access request control devices $14A_0$ to $14D_0$ of the system 0 transfer pipeline are simultaneously loaded with the values of the vector address register, the vector address base register, and the vector address incrementation register read from the group of address registers 11, so that the respective elements of the vector are assigned to the access request control devices $14A_0$ to $14D_0$ as follows so as to create an access request.

Access request control devices (system 0 transfer pipeline)
$14A_0$: Elements 0, 4, 8, ..., 4n
$14B_0$: Elements 1, 5, 9, ..., 4n+1
$14C_0$: Elements 2, 6, 10, ..., 4n+2
$14D_0$: Elements 3, 7, 11, ..., 4n+3
where, n is 0 or a positive integer).

The access request control devices $14A_0$ to $14D_0$ effect address computations of access requests issued at the same time and then simultaneously stacks the results in the access request stack devices $15A_0$ to $15D_0$. Based on the addresses of the respective access requests, each of the access request stack devices $15A_0$ to $15D_0$ respectively transmits the request to any one of the objective priority decision devices 16A to 16D. In a case where a plurality of access requests contend with each other in any one of the priority decision devices 16A to 16D, one of the access requests is selected according to a predetermined priority so as to be sent to one of the groups of memory banks 17A to 17D. Read data obtained in response to the access request transmitted to the group of the memory banks is returned to the storage control device 19 after a fixed period of time (equivalent to an access period of time) such that read data items are set to the read data buffer devices $18A_0$ to $18D_0$ corresponding to the access request control devices $14A_0$ to $14D_0$, respectively. At a point of time when data items of the four access requests simultaneously issued from the access request control devices $14A_0$ to $14D_0$ are completely read out, the read data items are returned to the access request control devices $14A_0$ to $14D_0$ in an order of the request issuance so as to be stored in the vector registers 13A to 13D at the same time. Assignment of the vector registers to the vector elements is as follows.

Vector register
13A: Elements 0, 4, 8, ..., 4n
13B: Elements 1, 5, 9, ..., 4n+1
13C: Elements 2, 6, 10, ..., 4n+2
13D: Elements 3, 7, 11, ..., 4n+3

In the second read operation, similarly, the vector instruction control device 10 decodes a vector instruction and reads out from the group of address registers a code indicating a kind of the vector instruction and the contents of the vector address register having a number specified by the vector instruction, the vector address base register, and the vector address incrementation register, which are in this case supplied to the access request control devices $14A_1$ to $14D_1$ of the system 1 transfer pipeline so as to be simultaneously set to the access request control devices $14A_1$ to $14D_1$. The vector elements are grouped to be assigned thereto so as to generate an access request.

Access request control devices (system 1 transfer pipeline)
$14A_1$: Elements 0, 4, 8, ..., 4n
$14B_1$: Elements 1, 5, 9, ..., 4n+1
$14C_1$: Elements 2, 6, 10, ..., 4n+2
$14D_1$: Elements 3, 7, 11, ..., 4n+3
where, n is 0 or a positive integer.

The access request control devices $14A_1$ to $14D_1$ effect address computations of access requests issued at the same time and then simultaneously stacks the results in the access request stack devices $15A_1$ to $15D_1$. Based on the addresses of the respective access requests, each of the access request stack devices $15A_1$ to $15D_1$ respectively transmits the request to either one of the objective priority decision devices 16A to 16D. In a case where a plurality of access request contend with each other in any one of the priority decision devices 16A to 16D, one of the access requests is selected according to a predetermined priority so as to be sent to one of the groups of memory banks 17A to 17D. Read data obtained in response to the access request transmitted to the group of the memory banks is returned to the storage control device 19 after a fixed period of time (equivalent to an access period of time) such that read data items are set to the read data buffer devices $18A_1$ to $18D_1$ corresponding to the access request control devices $14A_1$ to $14D_1$, respectively. At a point of time when data items of the four access requests simultaneously issued from the access request control devices $14A_1$ to $14D_1$ are completely read out, the read data items are returned to the access request control devices $14A_1$ to $14D_1$ in an order of the request issuance so as to be stored in the vector registers 13A to 13D at the same time. Assignment of the vector registers to the vector elements is the same as that described above.

Next, when arithmetic operations are to be carried out on data items stored in the vector registers 13A to 13D, the vector elements are assigned to the arithmetic units 12A to 12D as follows so as to supply the results of the arithmetic operations again thereto.

Arithmetic unit
12A: Elements 0, 4, 8, ..., 4n
12B: Elements 1, 5, 9, ..., 4n+1
12C: Elements 2, 6, 10, ..., 4n+2
12D: Elements 3, 7, 11, ..., 4n+3

In this arithmetic operations, the four arithmetic units 12A to 12D effect operations completely in a synchronous fashion, for example, the results of the elements 0, 1, 2, 3 are simultaneously attained and are then stored in the vector registers 13A to 13D at the same time.

Finally, in a case where data items stored in the vector registers 13A to 13D are to be written in the storage device 17, either one of the transfer pipelines of the respective systems is determined for use in the similar fashion to that employed in the data read operation described above such that the respective elements are assigned to the access request control devices $14A_0$ to $14D_0$ or $14A_1$ to $14D_1$; furthermore, address information is also set. Four elements thus assigned, for example, elements 0, 1, 2, and 3 are transmitted to the corresponding access request stack devices $15A_0$ to $15D_0$ or $15A_1$ to $15D_1$. The subsequent processing up to an operation to send an access request to the storage 17 is similar to that adopted in the read operation above.

As described above, the four arithmetic units 12A to 12D, the four vector registers 13A to 13D, and the four access request control devices $14A_0$ to $14D_0$ as well as $14A_1$ to $14D_1$ conduct the processing in a synchronized fashion. In consequence, in a parallel element pipeline processing system associated with the synchronized operation, there can be adopted a logic configuration in which one control system logic is used to control the four arithmetic units 12A to 12D, the four vector registers 13A to 13D, and the four access request control devices $14A_0$ to $14D_0$ as well as $14A_1$ to $14D_1$.

However, when the transfer pipelines of the systems 0 and 1 simultaneously effect operations, there may occur a case where a contention takes place between the access requests of the pipelines of the systems 0 and 1 such that only a particular access request among the four access requests is set to a wait state; in consequence, if an attempt is made to conduct a parallel element pipeline processing to conduct processing by establishing synchronization among the access requests issued at the same time, there may be caused a considerable deterioration of the performance. In order to overcome this difficulty, there is required a priority decision device associated with a storage control method in which the processing of the system 0 transfer pipeline and that of the system 1 transfer pipeline are partially serialized so as to prevent the contention therebetween.

Next, referring to FIG. 7, description will be given of the priority decision device in the storage control apparatus.

The vector instruction control device 10 reads out the contents of a vector address register with a number specified by a vector instruction, the vector address base register, the vector address incrementation register so as to simultaneously set the obtained values to the groups of address registers 2a0, 2a1, and 2a2 provided in the access request control devices $14A_0$ to $14D_0$ or $14A_1$ to $14D_1$, respectively. The instruction code of the vector instruction is decoded to detect information indicating whether the instruction is an ordinary load instruction or a store instruction (which are not the load and store operations of a list vector) and information indicating whether the access width of the storage device is four or eight bytes such that '1' is loaded in the flip-flop circuits 2a3A of the access request control devices $14A_0$ to $14D_0$ if the instruction is an ordinary load/store instruction; otherwise, '0' is set to the flip-flop circuits 2a3A; and if the access width is eight bytes, '1' is loaded in the flip-flop circuits 2a3B, whereas '0' is loaded in the flip-flop 2a3C if the access width is four bytes. The operations above are simultaneously achieved in all access request control devices thus arranged. These information items are not updated until the operation of the next vector instruction is conducted. The access request control devices $14A_0$ to $14D_0$ or $14A_1$ to $14D_1$ supply an address compute unit 2a4 with the values of the vector address register, the vector address base register, and the vector address incrementation register set to the group of address registers 2a0, 2a1, and 2a2 so as to attain addresses to be accessed in the storage device. In the ordinary load/store instruction, the computation method is as follows.

Access request control device $14A_{0/1}$: "Vector address register"+"Vector address base register"+("Vector address incrementation register"×4n)

$14B_{0/1}$: "Vector address register"+"Vector address base register"+("Vector address incrementation register"×4n+1)

$14C_{0/1}$: "Vector address register"+"Vector address base register"+("Vector address incrementation register"×4n+2)

$14D_{0/1}$: "Vector address register"+"Vector address base register"+("Vector address incrementation register"×4n+3)

where, n is 0 or a positive integer.

The obtained address is set to the address computation result register 2a6. Moreover, the access request control devices $14A_0$ to $14D_0$ or $14A_1$ to $14D_1$ each include a detecting circuit 2a5 for detecting whether or not a consecutive area is accessed in the storage device. The detecting circuit 2a5 sets '1' to an address consecutive flip-flop circuit 2a7 in a case where the instruction is an ordinary load/store instruction, the access width of the storage device is eight bytes, and the value of the vector address incrementation register is eight bytes or in a case where the instruction is an ordinary load/store instruction, the access width of the storage device is four bytes, and the value of the vector address incrementation register is four bytes. When the flip-flop circuit 2a7 is set to '1' it is indicated that an area associated with consecutive addresses (to be referred to a state of address consecutive) is accessed in the storage device. The four associated access request control devices $14A_0$ to $14D_0$ or $14A_1$ to $14D_1$ simultaneously obtain the results of address computations and address consecutive information and then add the obtained items to the access requests, which are at the same time sent to the access request stack devices $15A_0$ to $15D_0$ or $15A_1$ to $15D_1$, respectively.

Figure 8:
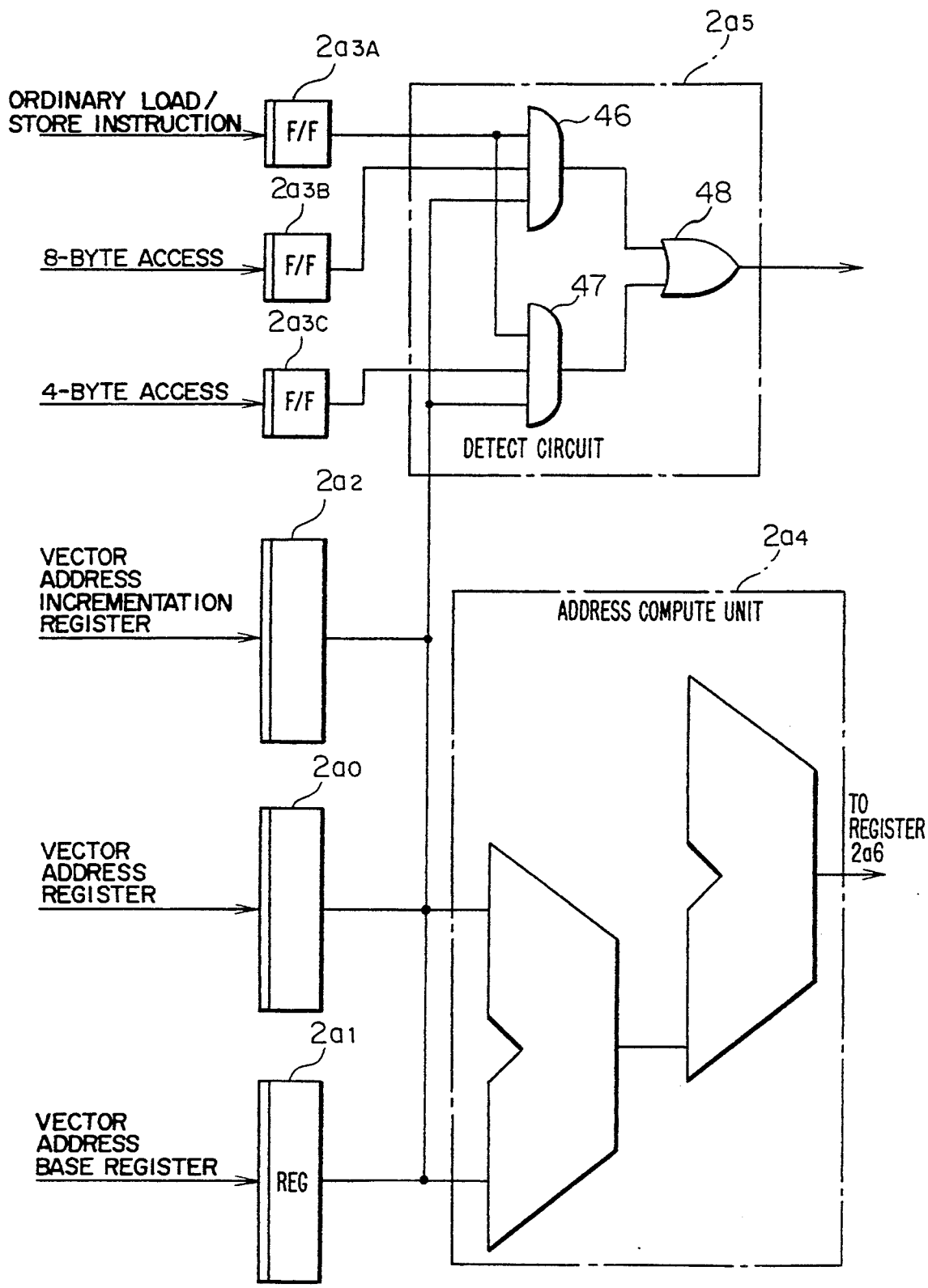
FIG. 8 is a schematic circuit diagram showing in detail the access request control device.
Figure 9:
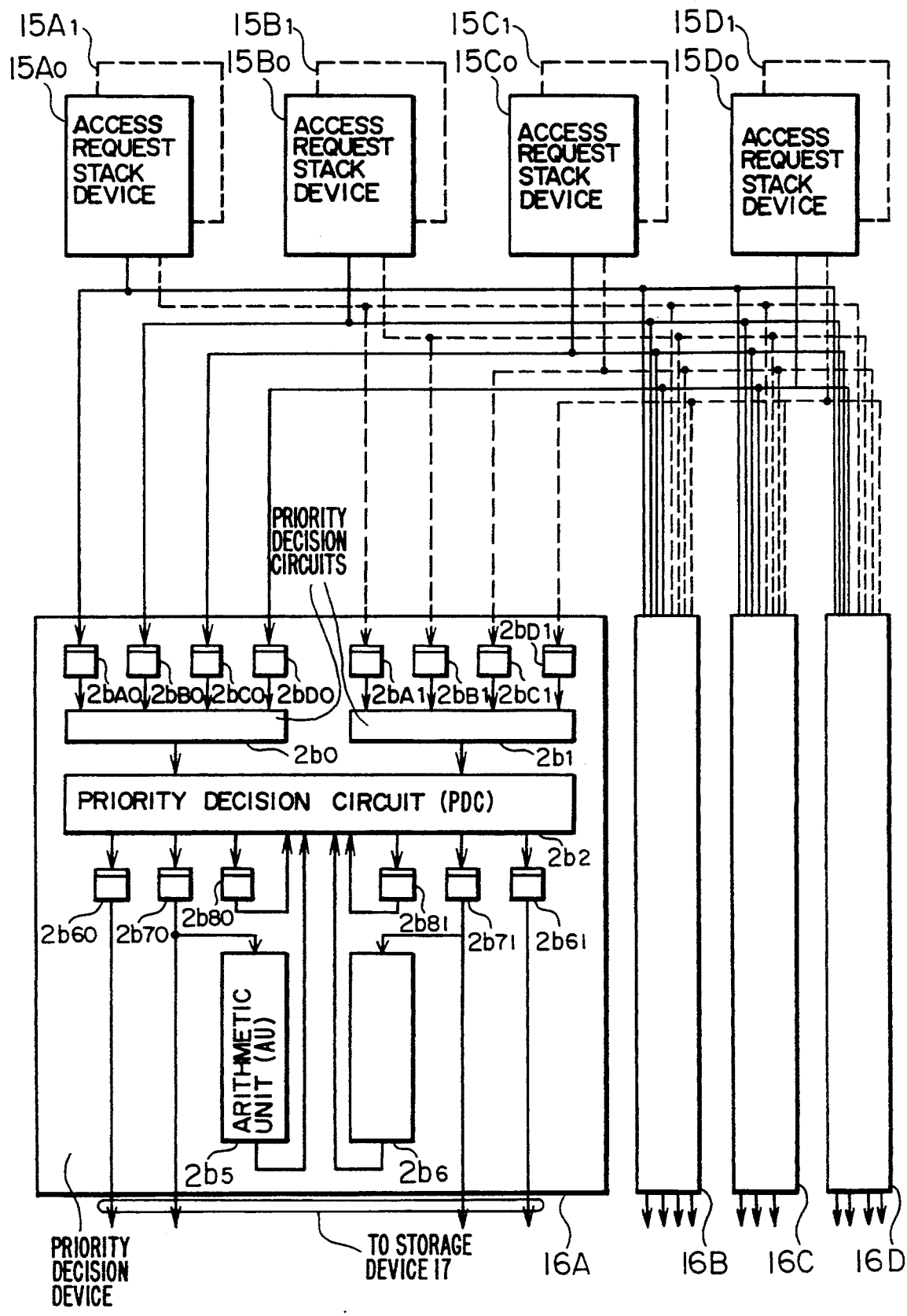
FIG. 9 is a detailed configuration diagram of a priority decision device.

FIG. 8 shows a detailed configuration diagram of the access request control devices $14A_0$ to $14D_0$ or $14A_1$ to $14D_1$. Description will now be given particularly of the detecting circuit 2a5. The detecting circuit 2a5 includes an AND gate 46 for ANDing an output from a flip-flop 2a3A, an output from a flip-flop 2a3B, and an output from a register 2a2 and outputs "1" in a case where the instruction is an ordinary load/store instruction, the access instruction is of a width of eight bytes, and the vector address incrementation register has a value of $\pm 8$ bytes, that is, it is indicated that an area of consecutive addresses is accessed in the storage device. Furthermore, there is provided an AND gate 47 for ANDing an output from a flip-flop 2a3A, an output from a flip-flop 2a3C, and an output from a register 2a2 and outputs "1" in a case where the instruction is an ordinary load/store instruction, the access instruction is of a width of four bytes, and the value of the vector address incrementation register is $\pm 4$ bytes, that is, it is indicated that an area of consecutive addresses is accessed in the storage device. These two AND gates 46 and 47 deliver outputs, which are supplied to an OR gate 48 so as to attain an output of "1" when either one of the outputs from the AND gates 46 and 47 is "1", thereby indicating that the consecutive address area is accessed in the storage device.

Figure 7:
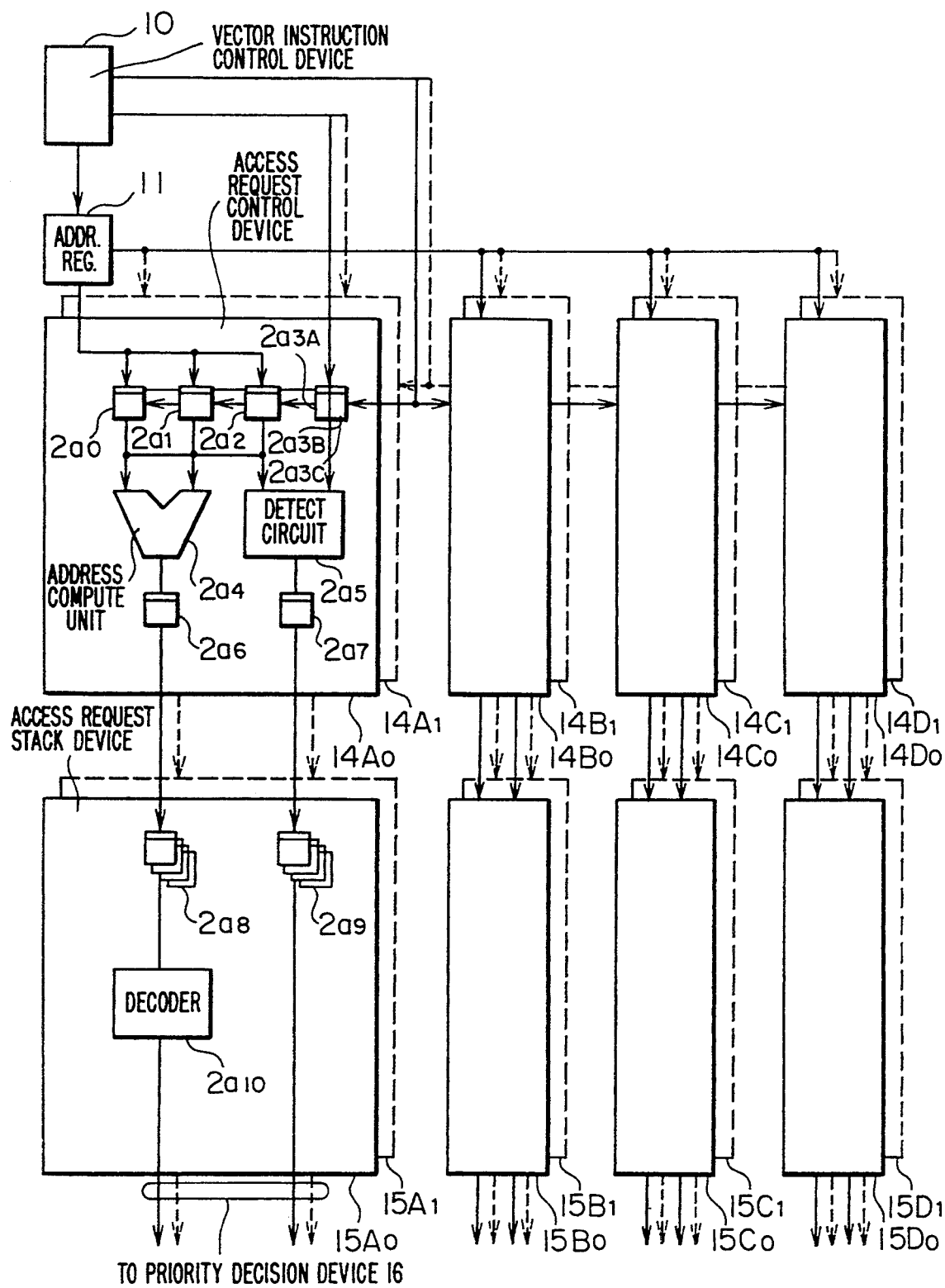
FIG. 7 is a detailed configuration diagram of an access request control device and an access request stack in an embodiment according to the present invention.

The access request stack devices $15A_0$ to $15D_0$ or $15A_1$ to $15D_1$ each include as shown in FIG. 7 a plurality of (four in this example) stacks 2a8 for storing addresses and a plurality of (four in this example) stacks 2a9 for storing address consecutive information such that addresses and address consecutive information items issued from the associated access request stack device are sequentially stacked therein in a sequence of the stack numbers 0, 1, 2, 3, 0, etc., and the stacks are controlled so that the content of the stack 0 is not updated until the content thereof is transmitted to the related priority decision device. The access request stack devices $15A_0$ to $15D_0$ or $15A_1$ to $15D_1$ each read out the content of the address thus stacked so as to decode the content by use of a read decoder 2a10 to determine one of the groups of memory banks associated with a priority decision device to which the address is to be transmitted; and the address and the address consecutive information are added to an access request, which is then sent to the priority decision device corresponding to the determined group of memory banks. The priority decision devices 16A to 16D corresponding to the determined group of memory banks each include registers $2bA_0$ to $2bD_0$ for setting thereto access requests, addresses, and address information items from the access request stack devices $15A_0$ to $15D_0$ of the system 0 transfer pipeline, registers $2bA_1$ to $2bD_1$ for setting thereto access requests, addresses, and address information items from the access request stack devices $15A_1$ to $15D_1$ of the system 1 transfer pipeline, a circuit 2b0 for determining priority of the system 0 transfer pipeline, and a circuit 2b1 for determining priority of the system 1 transfer pipeline. The priority decision circuits 2b0 and 2b1 each select the access requests respectively issued from the access request stacks of the transfer pipelines of the systems 0 and 1, for example, in the priority orders such as $2bA_0 > 2bB_0 > 2bC_0 > 2bD_0$ and $2bA_1 > 2bB_1 > 2bC_1 > 2bD_1$, thereby outputting the access request to a final priority decision circuit 2b2. In addition, there are provided a final priority decision circuit 2b2 for determining the priority levels when there occurs a contention between the banks to be accessed by the access requests respectively selected by the priority decision circuit 260 of the system 0 transfer pipeline and the priority decision circuit 2b1 of the system 1 transfer pipeline, registers 2b60. Also provided are 2b70, and 2b80 for the access request, the address, and the address consecutive information selected by the system 0 transfer pipeline, registers 2b61, 2b71, and 2b81 for the access request, the address, and the address consecutive information selected by the system 1 transfer pipeline. An arithmetic unit 2b5 is provided for effecting an addition or an arithmetic operation on the address selected by the system 0 transfer pipeline, and an arithmetic unit 2b6 is provided for effecting an addition or an arithmetic operation on the address selected by the system 1 transfer pipeline. The arithmetic units 2b5 and 2b6 are each employed to forecast, when consecutive addresses are to be accessed, an address to be inputted after one machine cycle, two machine cycles, three machine cycles, and so on (namely, an address to be inputted within a bank busy period or an access time).

Figure 10:
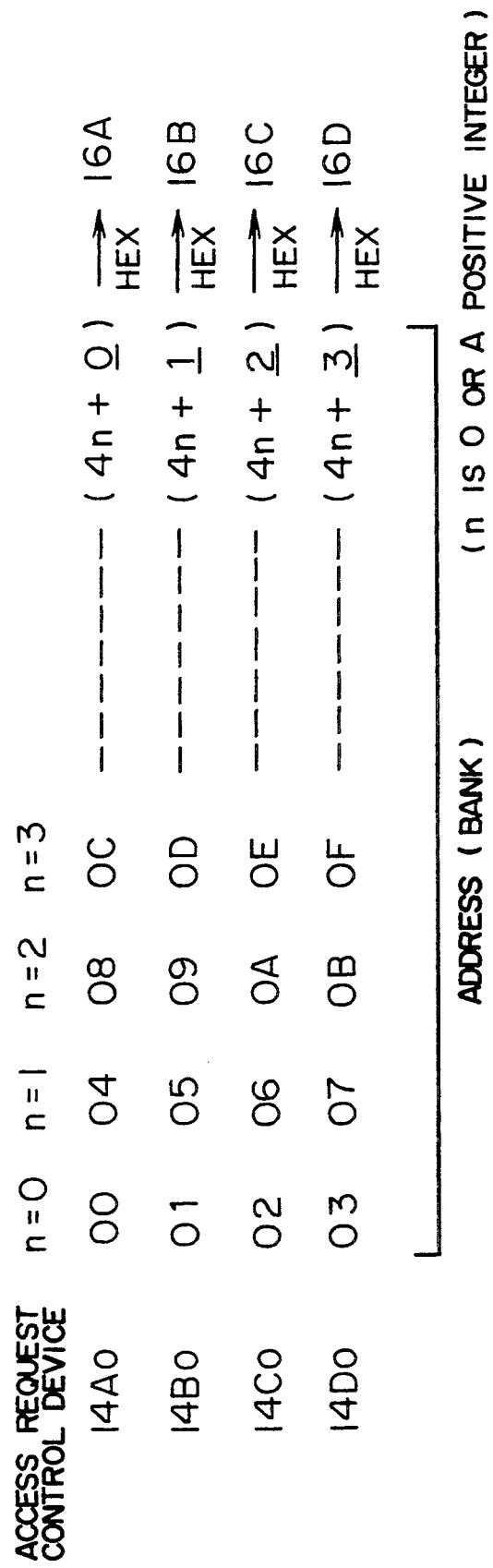
FIG. 10 is an explanatory diagram useful to explain an address to be generated by the access request control device.

For example, in this embodiment, there are respectively provided four access request control devices such that, as shown in FIG. 10, the access request control devices $14A_0$ to $14D_0$ respectively generate addresses $(4n)_{HEX}$, $(4n+1)_{HEX}$, $(4n+2)_{HEX}$, and $(4n+3)_{HEX}$, so that the access requests of the addresses $(4n)_{HEX}$, $(4n+1)_{HEX}$, $(4n+2)_{HEX}$, and $(4n+3)_{HEX}$ are inputted to the priority decision devices 16A to 16D, respectively. In each of the priority decision devices 16A to 16D, an address of the access request to be received as a result of a selection effected on the access requests is forecasted so as to be equal to "Selected address $\pm 4$ m", where 4 is the number of the priority decision devices and m is the number of machine cycles equivalent to the access time of the RAM constituting the storage device. Assuming m=3, the arithmetic units 2b5 and 2b6 of this embodiment effect computations of "Selected address $\pm 4$", "Selected address $\pm 8$", and "Selected address $\pm 12$" at the same time to forecast possible addresses to be received within three machine cycles. Moreover, the results (the forecasted addresses) are inputted to the final priority decision circuit 2b2.

Figure 11:
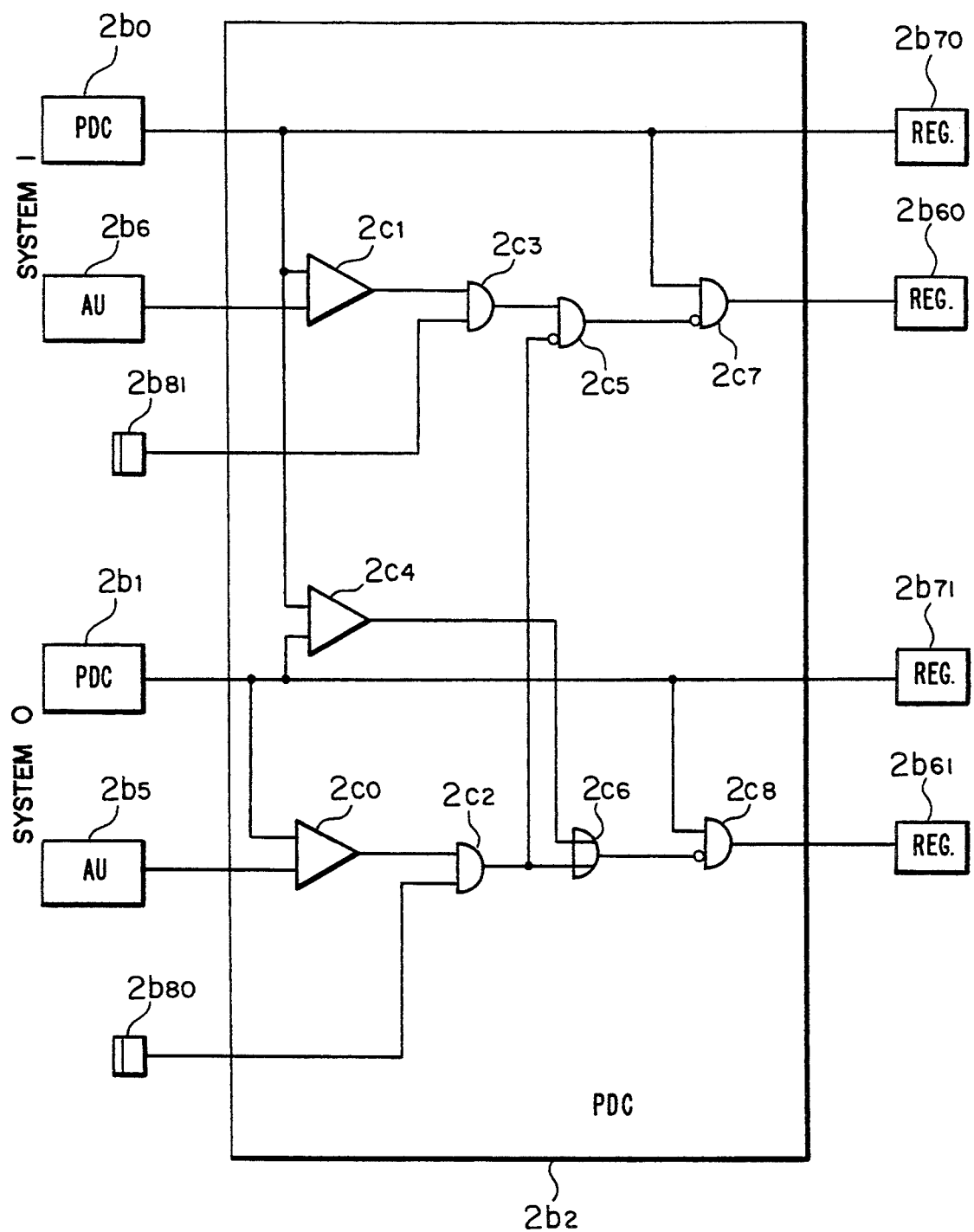
FIG. 11 is a detailed configuration diagram of a final priority decision circuit of FIG. 8.

The final priority decision circuit 2b2 is configured as shown in FIG. 11. First, an address of an access request selected by the priority decision circuit 2b0 of the system 0 transfer pipeline is compared in a comparator 2c1 respectively with the addresses of access requests forecasted by the address forecast arithmetic unit 2b6 for the points of time of 1, 2, and 3 machine cycles thereafter. If at least one of the forecasted addresses matches with the address, the comparator 2c1 delivers "1" to an output thereof. The output is supplied to an AND gate 2c3, which then ANDs the output signal with an output from a flip-flop 2b81 indicating whether or not the access request selected by the system 1 transfer pipeline is associated with the address consecutive operation. If the output from the flip-flop 2b81 is "1" denoting the address consecutive operation, "1" is supplied to an input of an AND gate 2c5.

In this situation, if the AND gate 2c2 delivers an output "0", the output from the AND gate 2c5 is set to "1" and is supplied to an inversion input of the AND gate 2c7. This causes the output from the AND gate 2c7 to be set to "0" and hence the access request from the priority decision circuit 2b0 is prevented from being stored in the register 2b60. In this case, however, the access request on the system 1 pipeline is not canceled, namely, is set to a wait state until the period of the bank busy time is elapsed, that is, until the output from the AND gate 2c3 as the prevention or suppression signal is set to "0".

Similarly, the output result from the address forecast arithmetic unit 2b5 is compared in a comparator circuit 2c0 with the addresses of access requests selected by the priority decision circuit 2b1 of the system 1 transfer pipeline. If a matching condition occurs, the output signal is set to "1" and is sent to an AND gate 2c2, which then ANDs the output signal with an output from a flip-flop 2b80 indicating whether or not the access request selected by the system 0 transfer pipeline is of the address consecutive operation. If the output from the flip-flop 2b80 is "1" denoting the address consecutive operation, "1" is supplied to an input of an AND gate 2c2. The output "1" from the AND gate 2c2 is supplied via the OR gate 2c6 to an inversion input of the AND gate 2c8, which consequently delivers an output "0", which prevents the access request from the priority decision circuit 2b1 from being stored in the register 2b61.

The outputs from the AND gates 2c3 and 2c2 are here set to "1", namely, in a case where the addresses respectively forecasted by the address forecast arithmetic units 2b5 and 2b6 respectively of the transfer pipelines of the systems 0 and 1 mutually match with the addresses of the other access requests, the output "1" from the AND gate 2c2 is fed to an inversion input of the AND gate 2c5, which accordingly delivers an output "0". Consequently, the output "0" from the AND gate 2c5 is delivered to an inversion input of the AND gate 2c7, and hence the access request from the priority decision circuit 2b0 is not prevented and is supplied via the AND gate 2c7 to the register 2b60, whereas the corresponding address is directly stored in the register 2b70. In addition, since the output "1" from the AND gate 2c2 is fed via the OR gate 2c6 to an inversion input of the AND gate 2c8, the output from the AND gate 2c8 is set to "0", which prevents the access request from the priority decision circuit 2b1 from being stored in the register 2b61. In this manner, when both access requests from the transfer pipelines of the systems 0 and 1 are selected and both suppression or prevention signals associated therewith are set to "1", the system effects a control operation to turn the suppression signal of the system 0 off.

In addition, it is natural that if there exists a time difference between the starting points of the respective processing, the suppress function from the preceding transfer pipeline takes precedence. According to this suppression logic, the preceding memory access is preferentially selected and the access request is transmitted to the storage device, whereas the succeeding memory access is set to and is kept in a wait state for a period of the bank busy time so as to be sent to the storage device with a delay. That is, in a case where an access of the other transfer pipeline is associated with consecutive addresses, when an address of an access request forecasted for the bank busy time matches with the address of the access request of the other transfer pipeline, the access request of the other transfer pipeline is kept in the wait state for a period of the bank busy time.

Incidentally, in a case where the access addresses of the transfer pipelines of the systems 0 and 1 are not consecutive, the inversion inputs of the AND gates 2c7 and 2c8 are both "0" regardless of the output values from the address comparators 2c0 and 2c1, and hence the access requests from the priority decision circuits 2b0 and 2b1 are stored in the registers 2b60 and 2b61.

In addition, independently of the access request suppress function, in a case where the addresses of the access requests simultaneously selected by the priority decision circuits 2b0 and 2b1 match with each other, it is necessary to suppress either one of the access requests, for example, the access request from the system 1. For this purpose, these two addresses are compared with each other in the comparator 2c4, and when these addresses match with each other, the output from the comparator 2c4 is set to "1" so as to be supplied via the OR gate 2c6 to an inversion input of the AND gate. As a result, the access request from the priority decision circuit 2b1 of the system 1 is suppressed, and in consequently, the access request from the priority decision circuit 2b0 of the system 0 is preferentially processed.

The priority decision devices 16A to 16D respectively associated with the groups of memory banks conduct operations similar to those described above such that in accordance with the supression logic, four preceding access requests are transmitted to the storage device in a parallel fashion.

As a result, for the succeeding memory access, including a wait time of the cycle time of the RAM constituting the storage device, the access requests can be consecutively transmitted. After the access requests are sent to the storage device, the load instruction (for a data read operation) is conducted as described above.

Figure 12:
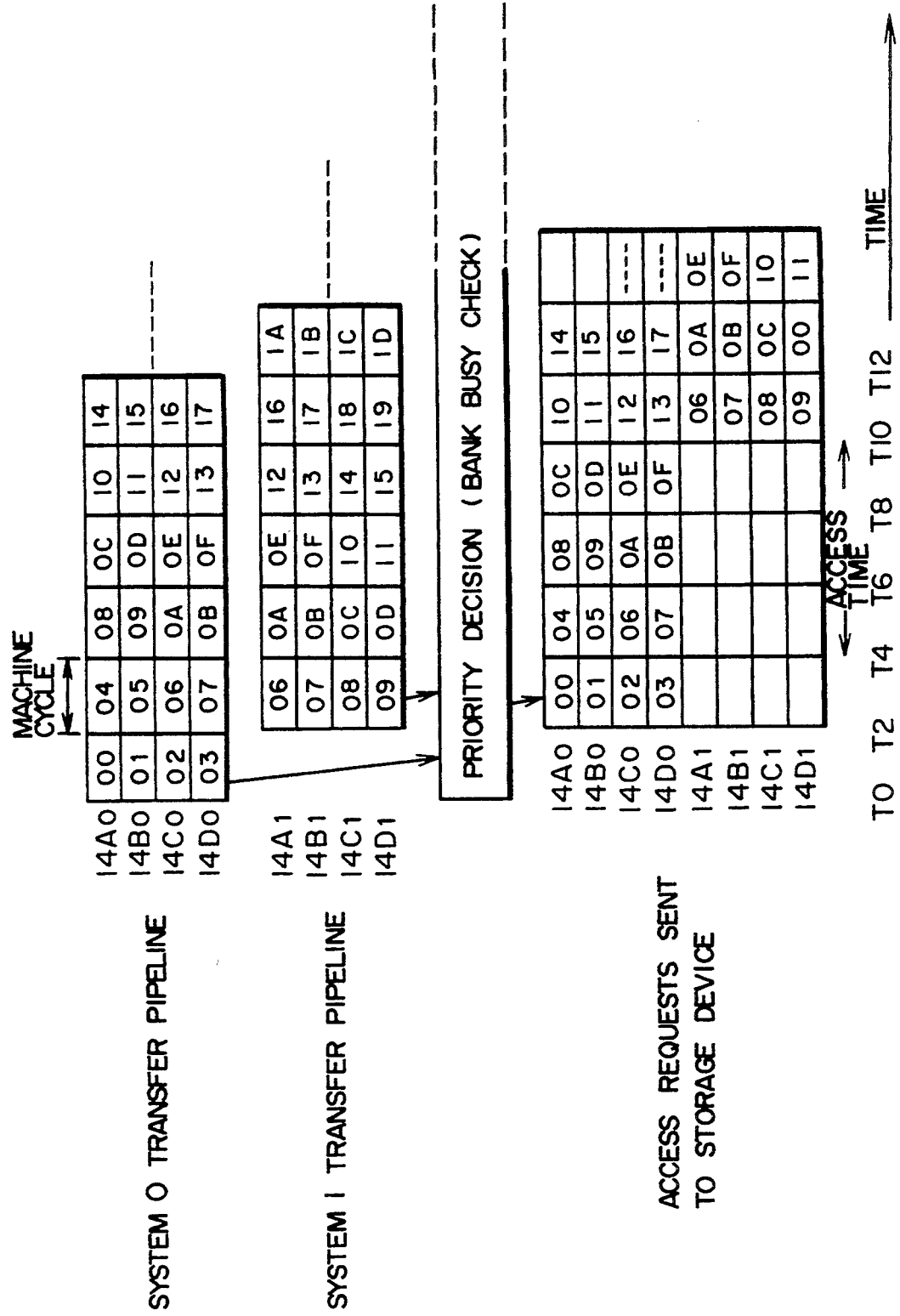
FIG. 12 is a diagram showing a flow of access request processing in the storage control device according to the present invention.

Referring now to FIG. 12, description will be given of the access request processing in the priority decision device.

Assume that, as shown in FIG. 12, the system 0 transfer pipeline accesses a consecutive address area beginning from the bank number 00, whereas the system 0 transfer pipeline accesses a consecutive address area beginning from the bank number 06. The access request control devices $14A_0$ to $14D_0$ of the system 0 transfer pipeline are assigned at time T0 with the bank numbers 00 to 03, respectively. In this situation, since the initiation of the system 1 transfer pipeline is delayed by one machine cycle, there does not exist any access request contending with the access requests from the system 0 transfer pipeline, and hence, the access requests issued from the access request control devices $14A_0$ to $14D_0$ are transmitted to the storage device. At time T2, the access request control devices $14A_0$ to $14D_0$ are assigned with the bank numbers 04 to 07, respectively.

In this state, for example, in a case where the addresses are judged to be consecutive in the priority decision device 16A, there are forecasted bank numbers 08, 0C, and 10 associated with the access request for one access time such that these values are compared with the bank number 08 of the access request from the system 1 transfer pipeline. Since the matching condition takes place for the bank number 08, the system suppresses the access request of the system 1 transfer pipeline which has issued the succeeding memory access. Next, at time T4, the priority decision device 16A forecasts the bank numbers, 0C, 10, and 14 associated with the access request. Since the matching condition takes place in this case for the bank number 0C of the access request from the system 1 transfer pipeline, the system also suppresses the access request of the system 1 transfer pipeline.

In this manner, the access requests of the system 1 transfer pipeline are kept suppressed up to the time T10. However, at the time T10, no contention exists between access request bank numbers respectively of the transfer pipelines of the systems 0 and 1. The bank number 08 of the access request issued from the system 1 transfer pipeline is stored in the register so as to access the corresponding memory bank 17A.

In the other priority decision devices 16B to 16D, the processing is effected in a similar fashion.

Figure 13A:
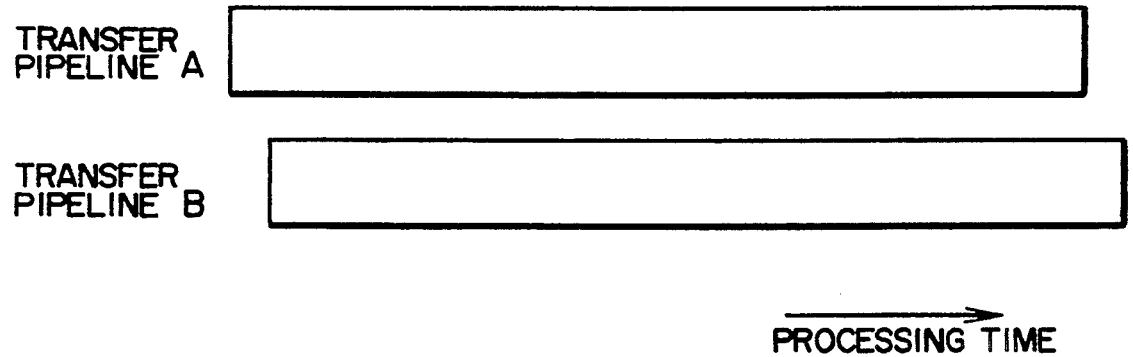
FIGS. 13A and 13B are diagrams respectively showing timing charts of the access request processing according to the prior art technology and to the present invention.
Figure 13B:
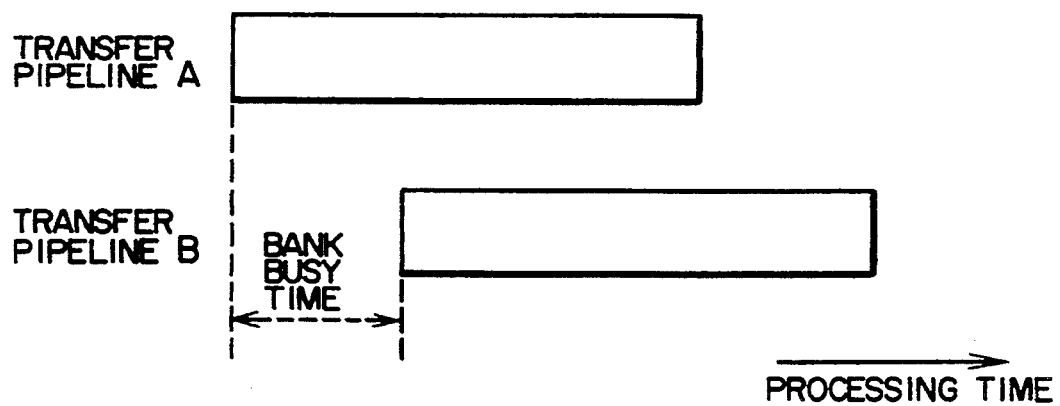

FIGS. 13A and 13B are explanatory diagrams useful to explain processing time associated with access requests in cases respectively of the prior art technology and the embodiment according to the present invention.

FIG. 13A shows a case of the prior art technology in which a contention takes place between access requests respectively of the transfer pipelines A and B, which leads to a situation where neither one of the pipelines can effect all access requests in a parallel fashion and hence the processing time of each pipeline is increased. Furthermore, FIG. 13B shows a case of the embodiment according to the present invention in which a contention takes place between access requests respectively of the transfer pipelines A and B such that, in this situation, although the processing on the side of the transfer pipeline B is set to and is kept in a wait state for the bank busy time (access time) so as to delay the initiation of the processing of the transfer pipeline B, it is possible in the subsequent processing to avoid the contention between the access requests respectively of the pipelines A and B, which hence enables the overall processing time to be minimized.

According to the embodiment of the present invention, also in the storage control apparatus having memory access pipelines of the parallel element pipeline processing method, in which the access requests simultaneously issued from the access request control devices $14A_0$ to $14D_0$ or $14A_1$ to $14D_1$ are processed with a synchronization established between the access requests, it is possible to prevent decrease of the performance due to the decided problems and hence the access instruction can be processed at a high speed.

In the embodiment above, although there are provided two transfer pipelines, the present invention can also be applied to cases where the number of transfer pipelines is three or more.

Next, description will be given of another embodiment in which a storage device is shared among a plurality of vector processors such that access instructions from the plural vector processors are processed by use of a plurality of transfer pipelines corresponding thereto.

Figure 1:
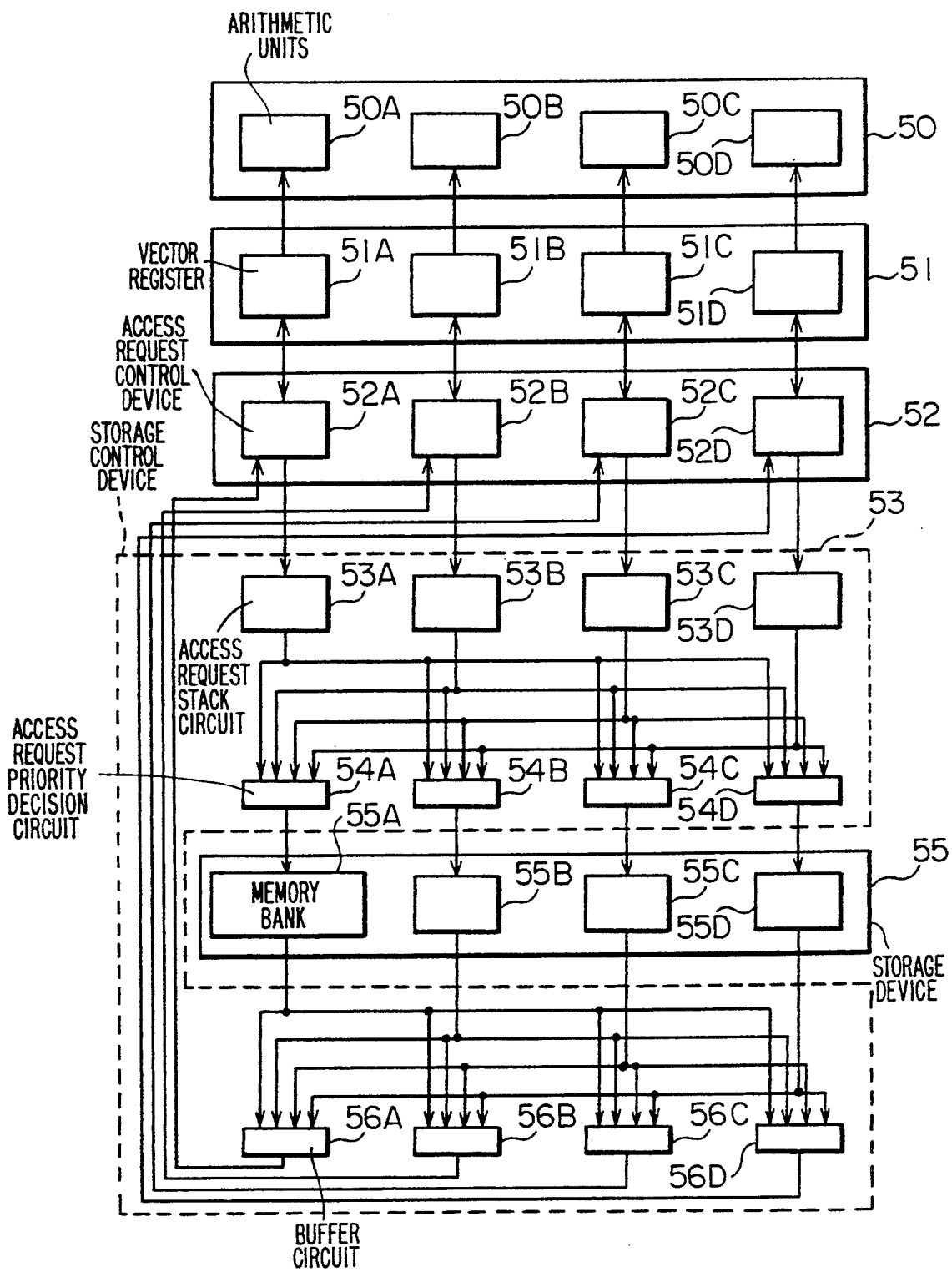
FIG. 1 is a block diagram showing an example of a conventional computer system.
Figure 4:
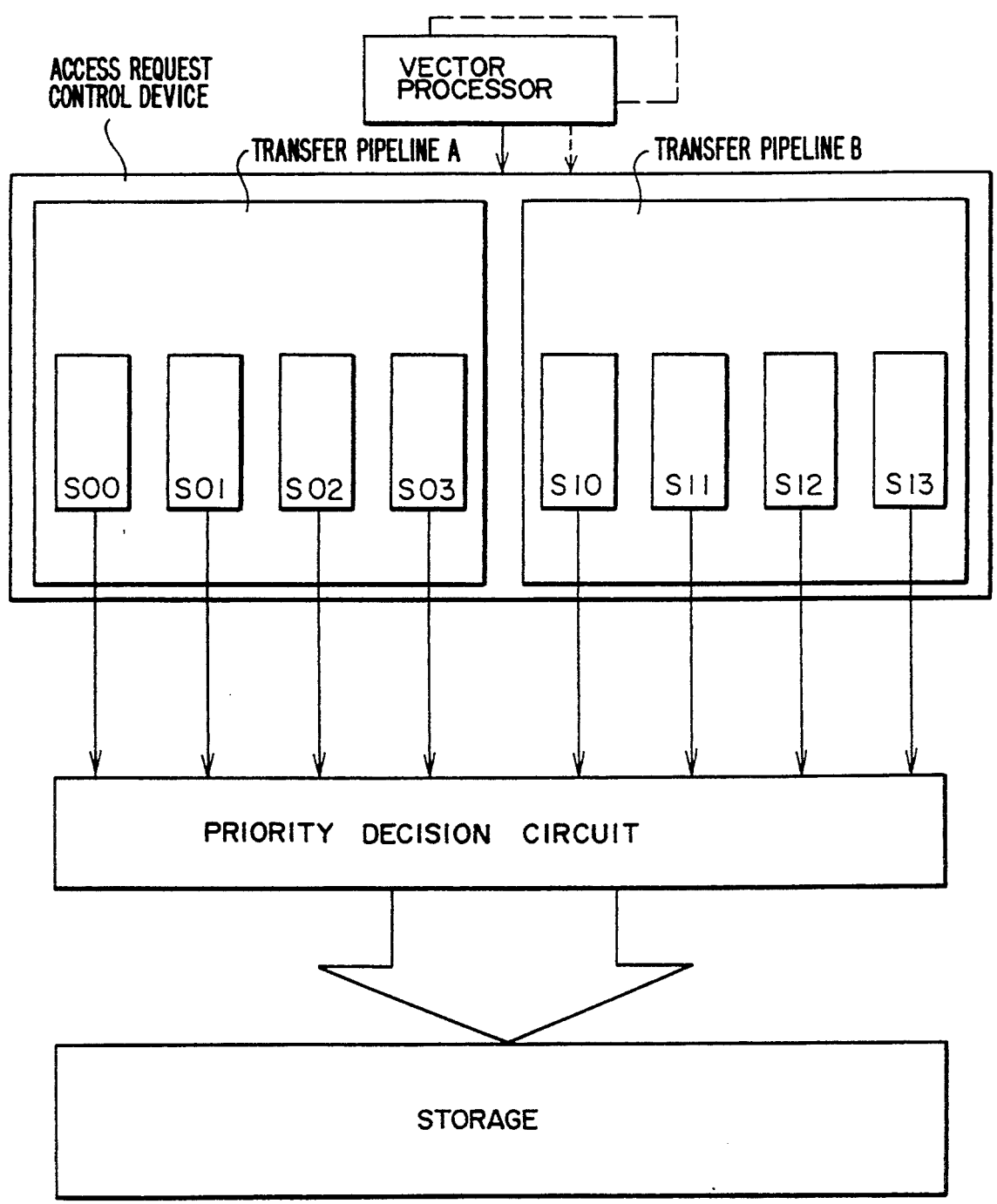
FIG. 4 is a block diagram showing an example of a computer system including two transfer pipelines.
Figure 14:
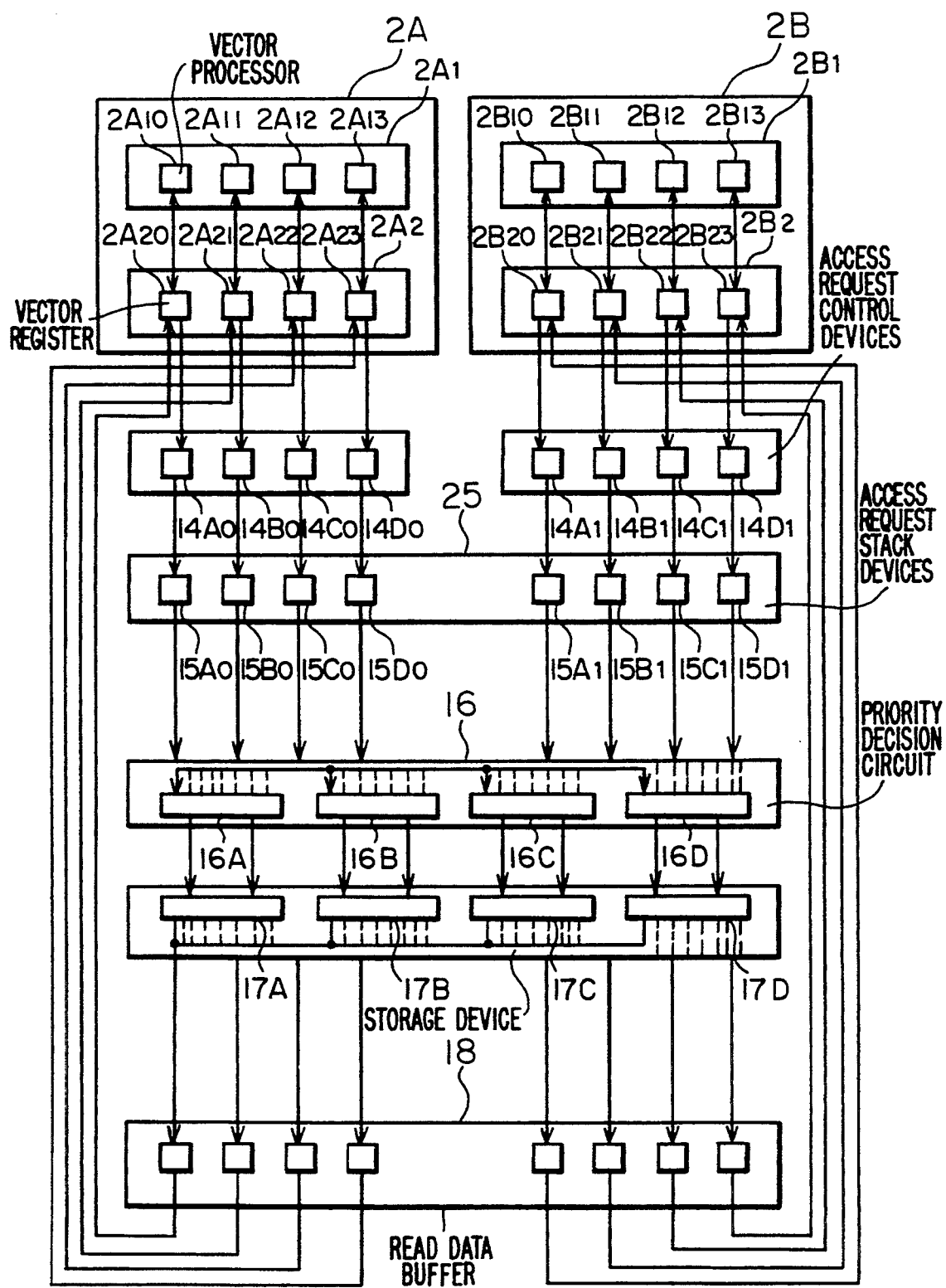
FIG. 14 is a block diagram showing a configuration example of a computer system to which another embodiment of the storage control device is applied according to the present invention.

FIG. 14 is a block diagram showing the constitution of a computer system to which the embodiment is applied, namely, the primary portion of a computer system having a plurality of (for example, two) vector processors (also referred to as vector processor units), each processing vector instructions in the parallel element pipeline processing method. In this configuration, the same reference numbers are assigned to the components having the same functions as those shown in FIG. 1.

In FIG. 14, reference numeral 2A represents a vector processor having a plurality of (e.g. four) vector processors 2A10 to 2A13 and four vector registers 2A20 to 2A23 respectively corresponding thereto, whereas reference numeral 2B is a vector processor having a plurality of (e.g. four) vector processors 2B10 to 2B13 and four vector registers 2B20 to 2B23 respectively corresponding thereto.

There are provided two sets of access request control devices $14A_0$ to $14D_0$ and $14A_1$ to $14D_1$ which are respectively responsive to instructions from the corresponding vector processors 2A and 2B so as to accomplish the creation and issuance of access requests and computation of addresses. Consequently, in this embodiment, the access request control devices $14A_0$ to $14D_0$, access request stack devices $15A_0$ to $15D_0$ respectively corresponding thereto, priority decision circuits 16A–16D, and read data buffer devices $18A_0$–$18D_0$ constitute a transfer pipeline; whereas the access request control devices $14A_1$ to $14D_1$, access request stack devices $15A_1$ to $15D_1$ respectively corresponding thereto, priority decision circuits 16A–16D, and read data buffer devices $18A_1$–$18D_1$ configure another transfer pipeline.

Figure 15:
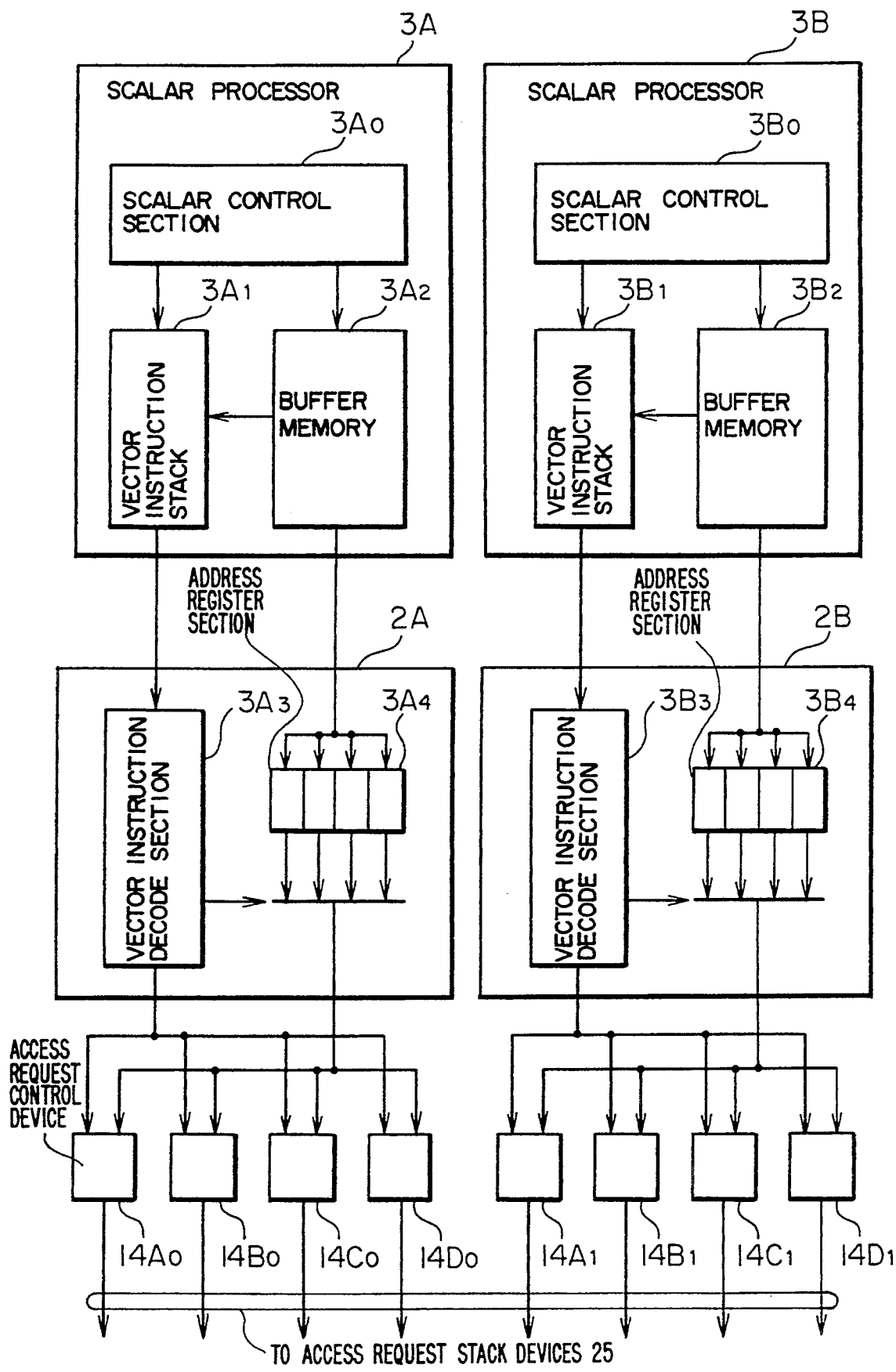
FIG. 15 is a schematic diagram showing interrelationships between a scalar processor, a vector processor, and an access request control device of FIG. 14.

FIG. 15 is an explanatory diagram useful to explain interrelationships between the scalar processors, vector processors, and access request control devices. Description will next be given of their interrelationships.

Ordinarily, in the vector processor, prior to an execution of an access instruction to access a vector, a scalar instruction is effected to store in an address register section 3A4 or 3B4 data indicating an address in the storage device such that a vector instruction is initiated after the address is stored in the address register section 3A4 or 3B4. In the embodiment, it is assumed that a vector load (read) instruction is executed in both of the vector processor 2A and 2B. In the scalar processor 3A or 3B, when a vector processor initiate instruction is decoded by the scalar instruction control section 3A0 or 3B0, a vector instruction is read from a memory area indicated by the pertinent vector processor initiate instruction and is then stored in the buffer memory 3A2 or 3B2, and then the vector instruction is sequentially read from the buffer memory 3A2 or 3B2 so as to be stacked in the vector instruction stack 3A1 or 3B1, respectively. The vector processor 2A or 2B includes a vector instruction decode section 3A3 or 3B3, which sequentially receives a vector instruction thus stacked and then decodes the vector instruction. In this example, the vector load instruction is received by the vector instruction decode section 3A3 or 3B3. The vector instruction decode section 3A3 or 3B3 decodes the vector instruction and reads the content of the specified address register section 3A4 or 3B4. The address registers to undergo the read operation include a vector address register, a vector address base register, and a vector address incrementation register. The vector instruction decode section 3A3 or 3B3 detects the content read from the address registers, information indicating that the decoded instruction is a simple or ordinary load instruction (other than the load instruction of a list vector), and a condition whether the access width for the storage device is four or eight bytes so as to send these information items and an access request issuance indication to the access request control devices $14A_0$ to $14D_0$ or $14A_1$ to $14D_1$.

In this configuration above, in a case where a contention takes place between the access requests respectively from the vector processors 2A and 2B, the access request control devices and the storage control devices perform similar operations to those of the embodiment described above such that the processing of the access requests of the transfer pipeline issuing the preceding access requests is preferentially effected and the access request processing of the transfer pipeline issuing the succeeding access requests is set to and is kept in a wait state for a period of the bank busy time.

Consequently, also in this embodiment, there is obtained an effect similar to that of the embodiment described above.

In this embodiment, although there are disposed two vector processors and two transfer pipelines, the number of these components may be respectively set to three or more.

As described above, according to the present invention, in a parallel element pipeline processing method in which the elements of an access instruction are allocated to a plurality of access request control devices so as to effect the processing thereof, when a plurality of access instructions are simultaneously processed through a plurality of memory access pipelines, the processing steps are serialized among the plural pipelines so as to avoid a disturbance associated with a contention, which enables the processing in the respective memory access pipelines to be executed at a high speed.

Furthermore, in the parallel element pipeline processing, since it is possible to prevent a considerable decrease in the performance, there is developed a great effect to further facilitate the implementation of the parallel element pipeline processing method in a multiprocessor.

While particular embodiments of the invention have been shown and described, it will be obvious to those skilled in the art that various changes and modifications may be made without departing from the present invention in its broader aspects.

We claim:

1. A storage control apparatus for a computer system having a plurality of transfer pipelines issuing access requests in a synchronized fashion to a plurality of memory banks of a storage device, each memory bank being independently accessible in response to an access instruction from a vector processing device of said computer system, each of said transfer pipelines including a plurality of access request control means, to which an access instruction from said vector processing device is allocated corresponding to elements of a vector such that a plurality of access requests are simultaneously issued in response to the allocated access instruction, said storage control apparatus comprising:

forecast means for forecasting access requests to be issued from a plurality of access request control means of one of said transfer pipelines;

access request contention judge means for determining whether the access requests forecasted by said forecast means contend with access requests issued from a plurality of access request control means of another one of said transfer pipelines; and priority decision means, operative when said access request contention judge means determines that a contention occurs, for setting the access requests from said another one of said transfer pipelines to a wait state for a predetermined period of time such that the access requests of said one of said transfer pipelines are preferentially processed, thereby accessing the storage device in a synchronized fashion.

2. A storage control apparatus according to claim 1 wherein:

said computer system includes a plurality of vector processing devices corresponding to said transfer pipelines; and said plurality of access request control means of each transfer pipeline are responsive to an access instruction from a vector processing device respectively corresponding thereto for issuing a plurality of access requests at the same time.

3. A storage control apparatus according to claim 1 wherein:

said predetermined period of time is substantially equal to a period of a bank busy time of said storage device; and said priority decision means processes the access requests of said another one of said transfer pipelines after said predetermined period of time has elapsed.

4. A storage control apparatus according to claim 3 wherein the access requests issued from said plurality of access request control means are issued within a period of a bank busy time of said storage device.

5. A storage control apparatus according to claim 1 wherein:

each access request control means includes consecutive area access detect means for detecting, based on the access instruction from said vector processing device, whether the access instruction accesses a consecutive address area in said storage device; and said priority decision means, is operative, when one of said consecutive area access detect means detects that a consecutive address area is to be accessed and said access request contention judge means determines that a contention takes place, to set the access requests from said another one of the transfer pipelines to a wait state for a predetermined period of time such that the access requests of said one of the transfer pipelines are preferentially processed in a synchronized fashion.

6. A storage control apparatus according to claim 5 wherein said priority decision means processes the access requests of each transfer pipeline according to a predetermined priority when one of said detect means detects that a consecutive address area is not to be accessed, thereby accessing said storage device in a synchronized fashion.

7. A storage control apparatus according to claim 5 wherein:

said predetermined period of time is substantially equal to a period of a bank busy time of said storage device; and said priority decision means processes the access requests of said another one of said transfer pipelines after said predetermined period of time has elapsed.

8. A storage control apparatus according to claim 7 wherein the access requests issued from said plurality of access request control means are issued within a period of a bank busy time of said storage device.

9. A storage control apparatus for a computer system having a plurality of transfer pipelines issuing access requests in a synchronized fashion to a plurality memory banks of a storage device, each memory bank being independently accessible in response to an access instruction from a vector processing device of said computer system, each of said transfer pipelines including a plurality of access request control means to which the access instruction from said vector processing device is allocated corresponding to elements of a vector such that a plurality of access requests are simultaneously issued in response to the allocated access instruction, said apparatus comprising:

a plurality of access request contention judge means respectively coupled to said plurality of memory banks of said storage device, each access request contention judge means comprising forecast means for receiving an access request from an associated one of said plurality of access request control means so as to forecast access requests to be issued within a predetermined period of time thereafter from the other access request control means of said one of said transfer pipelines, and judge means for determining whether the forecasted access requests contend with access requests issued from a plurality of access request control means of another one of said transfer pipelines; and a plurality of priority decision means respectively coupled to said plurality of access request contention judge means, each priority decision means, is operative, when one of said access request contention judge means determines that a contention occurs, for setting the access requests from said another one of the transfer pipelines to a wait state for a predetermined period of time such that the access requests of said one of said transfer pipelines are preferentially processed, thereby accessing the storage device in a synchronized fashion.

10. A storage control apparatus according to claim 9 wherein:

said vector processing device includes a plurality of vector processing units; and said plurality of access request control means of each transfer pipeline is responsive to an access instruction from one of said vector processing units respectively coupled thereto for issuing a plurality of access requests at the same time.

11. A storage control apparatus according to claim 9 wherein:
said predetermined period of time is substantially equal to a period of a bank busy time of said storage device; and
said priority decision means processes the access requests of said another one of said transfer pipelines after said predetermined period of time has elapsed.

12. A storage control apparatus according to claim 9 wherein:
each access request control means includes consecutive area access detect means for detecting, based on the access instruction from said vector processing device, whether the access instruction accesses a consecutive address area in said storage device; and
each of said plurality of priority decision means, being operative when the consecutive area access detect means coupled thereto detects that a consecutive address area is to be accessed and the judge means of a corresponding access request contention judge means determines that a contention takes place, for setting the access requests from said another one of said transfer pipelines to a wait state for a predetermined period of time such that the access requests of said one of said transfer pipelines are preferentially processed in a synchronized fashion.

13. A storage control apparatus according to claim 12 wherein each of said plurality of priority decision means processes the access requests of said transfer pipelines according to a predetermined priority, when the consecutive area access detect means corresponding thereto detects that a consecutive address area is not to be accessed, thereby accessing said storage device in a synchronized fashion.

14. A storage control apparatus according to claim 12 wherein:
said predetermined period of time is substantially equal to a period of a bank busy time of said storage device; and
said priority decision means processes the access requests of said another one of said transfer pipelines after said predetermined period of time has elapsed.

15. A storage control method for a computer system having a plurality of transfer pipelines issuing access requests in a synchronized fashion to a plurality of memory banks of a storage device, each memory bank being independently accessible in response to an access instruction from a vector processing device of said computer system, said method comprising:
a first step of allocating the access instruction from said vector processing device in association with elements of a vector;
a second step responsive to the allocated access instruction of issuing a plurality of access requests at the same time;
a third step of forecasting, based on issued access requests of one of said transfer pipelines, access requests to be issued within a predetermined period of time thereafter;
a fourth step of determining whether the forecasted access requests contend with access requests issued from another one of said transfer pipelines; and
a fifth step, operative when said fourth step determines that a contention takes place, of setting the access requests of said another one of said transfer pipelines to a wait state for a predetermined period of time such that access requests of said one of said transfer pipelines are preferentially processed, thereby accessing the storage device in a synchronized fashion.

16. A storage control method according to claim 15 wherein said predetermined period of time is substantially equal to a period of a bank busy time and said fifth step processes in a synchronized fashion the access requests of said another one of said transfer pipelines after said predetermined period of time has elapsed.

17. A storage control method according to claim 15 further including a sixth step for detecting, based on the access instruction from said vector processing device, whether the access instruction accesses a consecutive address area of the storage device wherein said fifth step detects that a consecutive address area is to be accessed and, when said fourth step determines that a contention takes place, said fifth step sets the access requests of said another one of said transfer pipelines to a wait state for a predetermined period of time such that the access requests of said one of said transfer pipelines are preferentially processed in the synchronized fashion.

18. A storage control method according to claim 17 wherein said fifth step processes the access requests of each transfer pipeline so as to access the storage device in a synchronized fashion when said sixth step detects that a consecutive address area is not to be accessed.

* * * * *